No. 780,071. PATENTED JAN. 17, 1905.
H. STASNY.
BOAT AND MEANS FOR PROPELLING SAME.
APPLICATION FILED JULY 29, 1904.

No. 780,071. Patented January 17, 1905.

UNITED STATES PATENT OFFICE.

HERMANN STASNY, OF FRANKFORT-ON-THE-MAIN, GERMANY.

BOAT AND MEANS FOR PROPELLING SAME.

SPECIFICATION forming part of Letters Patent No. 780,071, dated January 17, 1905.

Application filed July 29, 1904. Serial No. 218,696.

*To all whom it may concern:*

Be it known that I, HERMANN STASNY, a subject of the German Emperor, residing and having my post-office address at 43 Mittelweg, Frankfort-on-the-Main, Germany, have invented certain new and useful Improvements in Boats and Means for Propelling Same, of which the following is a specification.

The present invention relates to improvements in boats and means for propelling same, said means comprising a slide provided with movable paddles and adapted to be reciprocated longitudinally of the boat and mechanism for operating said slide, the latter being connected to an endless chain driven by a second endless chain adapted to be moved to and fro by means of a handle.

Figure 1:
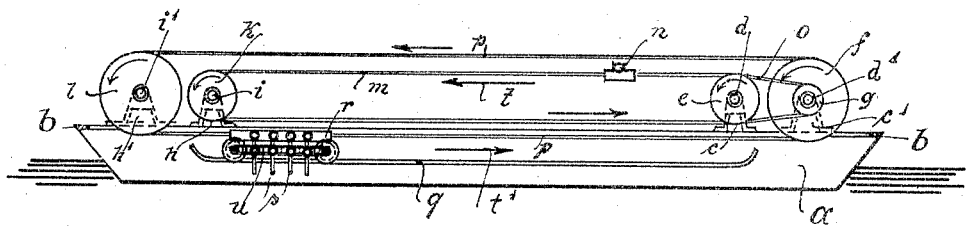
Figure 2:
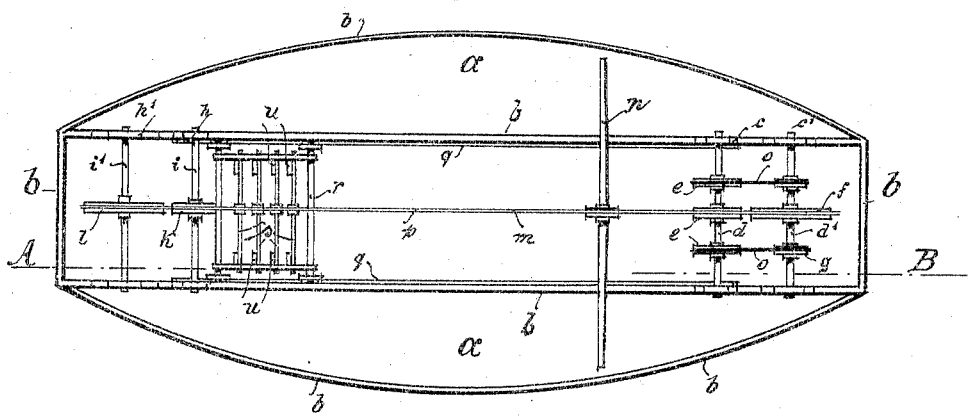

The invention is illustrated in the annexed drawings, Figure 1 being a longitudinal section of the boat on line A B of Fig. 2, which latter figure is a plan view.

The boat consists of two half parts or sections of boat-body $a\,a$, in which the oarsman is to sit, and these each have a curved side and a straight side, and the straight sides of the two sections are arranged opposite each other. The sections are connected together by a frame $b$, having the form of the two sections $a\,a$ of the body and a connection between them at the ends and comprising a flat iron frame or the like, and this serves to hold the two sections together, leaving a space between the two sections for the reception of the operating mechanism. The sliding seat or seats for the operator or operators is or are fixed to said frame in one or each half of the boat in any suitable and known manner.

At the stern of the boat two horizontal shafts $d$ and $d'$ are mounted in bearings $c\,c'$, fixed to the frame $b$, one of said shafts, $d$, carrying three chain-wheels $e$, of equal diameter, and the other shaft, $d'$, carrying a chain-wheel of larger diameter and two chain-wheels $g$ of smaller diameter than the aforesaid wheels $e$. At the bow part of the boat two other horizontal shafts $i$ and $i'$ are also mounted in bearings $h\,h$, fixed to the frame $b$, one of these shafts, $i$, carrying a chain-wheel $k$ and the other shaft, $i'$, carrying a chain-wheel $l$, the diameter of which is greater than that of the wheel $k$.

The central wheel of the three chain-wheels $e$ at the stem is connected by an endless chain $m$ to the smaller chain-wheel $k$ in the bow, and on this chain is arranged a transverse handle $n$, adapted to be reciprocated by the operators in the half parts of the boat. On this reciprocation of the handle the chain $m$ is given a corresponding movement, so that the three stern-wheels $e$ and the bow-wheel $k$ are rotated. The rotation of the shaft $d$, carrying said wheels $e$, is transmitted by two outer wheels, by means of chains $o$ and the small stern-wheels $g$, to the outer shaft $d'$ at an increased speed in the ratio chosen. The large chain-wheel $f$ on said shaft $d'$ is thus revolved, and said wheel $f$ is connected by a second endless chain $p$ to the larger bow chain-wheel $l$. By the arrangement of the various chain-wheels and their different relative connections the reciprocating movement given to the chain $m$ is transmitted to the chain $p$ in the ratio determined by the diameters of the chain-wheels.

To the inner wall or surface of each half $a$ of the boat is fixed a rail $q$, on which a slide or trolley $r$, connected to the chain $p$, is adapted to run, and on said slide $r$ are paddles $s$, pivoted in the known manner, so that on the movement of the slides in one direction they assume a vertical position, thus causing the boat to be propelled, and on movement in the opposite direction they assume a horizontal or inclined position and have no action on the water. The operation of the slide, and consequently the propulsion of the boat, is effected in a simple manner by the reciprocating movement of the handle.

I claim as my invention—

1. The combination with a boat of a carriage provided with movable paddles and adapted to be reciprocated longitudinally of the boat by an endless chain connected to said carriage, chain-wheels mounted on shafts $i'$ $d'$ and carrying said chain, a second endless chain, chain-wheels mounted on shafts $d\,i$ and carrying said second chain, a handle connected to the latter and transmission-gear between the aforesaid shafts $d$ and $d'$ substantially as described.

2. The combination with a boat comprising two half parts connected together by a frame, of guides connected to the inner walls of said half parts, a carriage provided with movable paddles and adapted to run on said guides, an endless chain $p$ connected to said carriage, chain-wheels $l\ f$ mounted on shafts $i'\ d'$ and carrying said chain $p$, a second endless chain $m$, chain-wheels $e\ k$ mounted on shafts $d\ i$ and carrying said chain $m$, a transverse handle $n$ connected to the latter, and variable-speed-transmission gear between the aforesaid shafts $d$ and $d'$ substantially as described, In testimony whereof I have signed my name to this specification in the presence of two subscribing witnesses.

HERMANN STASNY.

Witnesses:
    ERWIN DIPPEL,
    MICHAEL VOLKE.